(12) United States Patent
Shin

(10) Patent No.: US 7,839,985 B2
(45) Date of Patent: Nov. 23, 2010

(54) SYSTEM AND METHOD FOR VISITOR RECEPTION SERVICE IN ABSENCE

(75) Inventor: Young-Sik Shin, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 975 days.

(21) Appl. No.: 11/578,377

(22) PCT Filed: Apr. 13, 2005

(86) PCT No.: PCT/KR2005/001067

§ 371 (c)(1),
(2), (4) Date: Jan. 23, 2007

(87) PCT Pub. No.: WO2005/099358

PCT Pub. Date: Oct. 27, 2005

(65) Prior Publication Data

US 2008/0137816 A1    Jun. 12, 2008

(51) Int. Cl.
*H04M 11/00*    (2006.01)
(52) U.S. Cl. .................. 379/102.06; 379/102.07; 379/102.02; 348/14.01; 455/415
(58) Field of Classification Search ........... 379/102.06, 379/102.07, 102.01, 102.02, 90.01, 93.21, 379/93.17, 159; 348/14.01–14.16, 143, 152, 348/155; 455/415
See application file for complete search history.

(56) References Cited

U.S. PATENT DOCUMENTS

| 6,094,213 | A | * | 7/2000 | Mun et al. ............... 348/14.05 |
| 6,281,790 | B1 | | 8/2001 | Kimmel et al. |
| 6,529,230 | B1 | * | 3/2003 | Chong ..................... 348/14.01 |
| 7,683,924 | B2 | * | 3/2010 | Oh et al. .................. 348/14.01 |

FOREIGN PATENT DOCUMENTS

| EP | 0920210 | 6/1999 |
| KR | 10-2001-0089095 | 9/2001 |
| KR | 10/2005-0031334 | 4/2005 |
| WO | WO 03/028375 | 4/2003 |

OTHER PUBLICATIONS

International Search Report for PCT/KR2005/001067.

* cited by examiner

*Primary Examiner*—Melur Ramakrishnaiah
(74) *Attorney, Agent, or Firm*—Lowe Hauptman Ham & Berner LLP

(57) ABSTRACT

The present invention discloses a system and a method for a visitor reception service in absence. The present invention is applied to the system including a central server (HNSN) controlling devices and delivering their control statuses in being connected to the mobile network, and a gateway which interconnects with said HNSN through network and has connections with a plurality of devices, characterized in that the above gateway includes a Tel-Box (7) including a ring signal detection part detecting the number of sounding times of ring signal in the case that a call connection is requested from outside for a call path switching, an on/off hook detection part detecting on/off hook with an indoor telephone (12, 13, 14). According to the present invention, the convenience capable of doing reception for a visitor everywhere at once, irrespective of the place where the user having mobile station is can be provided.

6 Claims, 2 Drawing Sheets

SYSTEM AND METHOD FOR VISITOR RECEPTION SERVICE IN ABSENCE

Cross Reference to Related Application

This application is the National Phase application of International Application No. PCT/KR2005/001067, filed Apr. 13, 2005, which designates the United States and was published in English. This application, in its entirety, is incorporated herein by reference.

TECHNICAL FIELD

The present invention relates to a system and a method for a visitor reception service in absence, especially to the visitor reception service system in absence and the method thereof performing the switching for making a call path between a mobile station user and a residential indoor telephone as well as setting up a call path between a visitor and a mobile station user and controlling a door in absence.

Recently, with wide spreads of Internet and advances in communication technologies, attention is paid to the area related to home network and home automation for the connection and utilization of various electrical/electronic devices and communication devices at home and office.

While the existing devices for home automation such as a videophone and an interphone only certifying a visitor's identity have been the main stream, a plurality of functions such as gas escape detection and fire alarm are getting added to those devices. However, it can not be the home automation in a strict sense to collect such simple functions. That is, it would be the home automation in a strict sense not to make only a part of devices controlled and monitored, but to make these devices interconnected in a single network, thereby to make not only the devices connected to the network controlled, monitored, and worked together, but the computer related devices configured as a data network and then connected to Internet.

BACKGROUND ART

In the technologies related to the field of home network, standardization and technological development are being actively performed as classified by the communication technologies such as a wired LAN (i.e., a HomePNA and a IEEE1394), a wireless LAN (i.e., using HomeRF, etc.), a Bluetooth, and an IrDA communication. As it is called, the Lonworks based building automation system is being attracted attention in the area of home automation.

A unified standardization of the technologies related to home network and home automation is still unfinished, and home server and home gateway corresponding to a plurality of protocols and being required for performing integrated home automation control capable of supporting remote control and local home control using a wired or a wireless communication line or Internet is being developed.

Meanwhile, in corresponding to a plurality of communication protocols, the integrated manageable control system for the devices (home electrical/electronic appliances) dispersed at home is also being developed. That is, a control system for home network capable of simultaneously supporting the communication protocols such as IEEE1394, USB, IrDA, X-10, and Lonworks is being developed.

DISCLOSURE

[Technical Problem]

Thus, the system performing call path control with a visitor and the door control by the cooperation with an HNSN (HomeNetwork Serving Node) performing the function of a central server under the situations that home network and home automation, and an RG (Residential Gateway) located at home has never been presented yet.

[Technical Solution]

The present invention is for solving the above problem, and the objectives of the present invention are to provide the system for a visitor reception service in absence performing the switching for making a call path to a residential indoor telephone for a mobile station user, as well as setting up a call path between a visitor and a mobile station user and controlling a door in absence.

As the technological idea for achieving the objectives described in the above, the present invention is applied to the system including a central server (HNSN) controlling devices and delivering their control statuses in being connected to the mobile network, and a gateway (RG) which is connected to the above central server through a network and a plurality of devices are connected to. The system for a visitor reception service in absence in accordance with the present invention is characterized by having a Tel-Box in the above gateway, wherein the Tel-Box includes a ring signal detection part detecting the number of sounding times of ring signal in the case that call connection is requested from outside for call path switching, an on/off hook detection part with a residential indoor telephone, and a switch performing the switching for setting up a call path between the above mobile network and a device, or between the above mobile network and a residential indoor telephone.

Where, the above device is a door phone or a lobby phone, and open and close controls of a door are performed in the above door phone and a main system transmitting the visitor's image data is included in the above door phone.

In the meantime, another objective of the present invention is to provide a method for a visitor reception service in absence performing the switching for making a call path between a mobile station user and a residential indoor telephone, as well as setting up a call path between a visitor and a mobile station user and controlling a door in absence.

As the technological idea for achieving the objectives of the present invention described in the above, the present invention relates to the method for a visitor reception service in absence using the system comprising a central server (HNSN) controlling devices and delivering their control states by being connected to a mobile network;

and a gateway which includes a Tel-Box (7) including a ring signal detection part detecting the number of sounding times of ring signal in the case that a call connection is requested from outside for a call path switching, an on/off hook detection part detecting on/off hook with residential indoor telephones (12, 13, 14), and a switch performing the switching for setting up a call path between said mobile network and devices or between said mobile network and residential indoor telephones (12, 13, 14), interconnects with said HNSN through network, and has a connection with a door phone, characterized by comprising a step 1 that said central server performs the registration and the authentication for the gateway which a door phone is connected to;

a step 2 imaging a visitor using the camera equipped outside the door in the case of being called from the door phone, a step 3 transmitting said image data to a mobile station, a step 4 that said mobile station user confirms said image data and tries a call connection to a residential indoor telephone using a mobile station, and a step 5 setting up a call path between a mobile station and a door phone in the case that the number of sounding times of ring signal discriminated in said Tel-Box (7) is more than predetermined number of times.

Where, a step 6 that a mobile station connects to said central server and performs the door control can be proceeded after said step 5.

Moreover, a call path between said mobile station and a residential indoor telephone is set up by a switch of a Tel-Box (7) in case that a call connection between a mobile station and a residential indoor telephone is accomplished in said step 4.

And a going-out mode can be set by using a door phone in said step 1.

[Advantageous Effects]

As described in the above, the system and the method for a visitor reception service in absence in accordance with the present invention can provide the convenience capable of doing reception for a visitor everywhere at once, irrespective of the place where the user having a mobile station is.

DESCRIPTION OF THE NUMERALS ON THE MAIN PARTS OF THE DRAWINGS

| | |
|---|---|
| 1: a mobile station | 2: a base station |
| 3: PSTN(Public Switched Telephone Network) | |
| 4: HNSN(HomeNetwork Serving Node) | |
| 5: Internet | 6: Residential Gateway |
| 7: Tel-Box | 8: a main system |
| 9: a lobby phone | 10: a door phone |
| 11: a distributer | |
| 12, 13, 14: a residential (indoor) telephone 1, 2, 3 | |

[Mode For Invention]

Hereinafter, referring to appended drawings, the structures and operation principles for the embodiments of present invention are described in detail.

Figure 1:
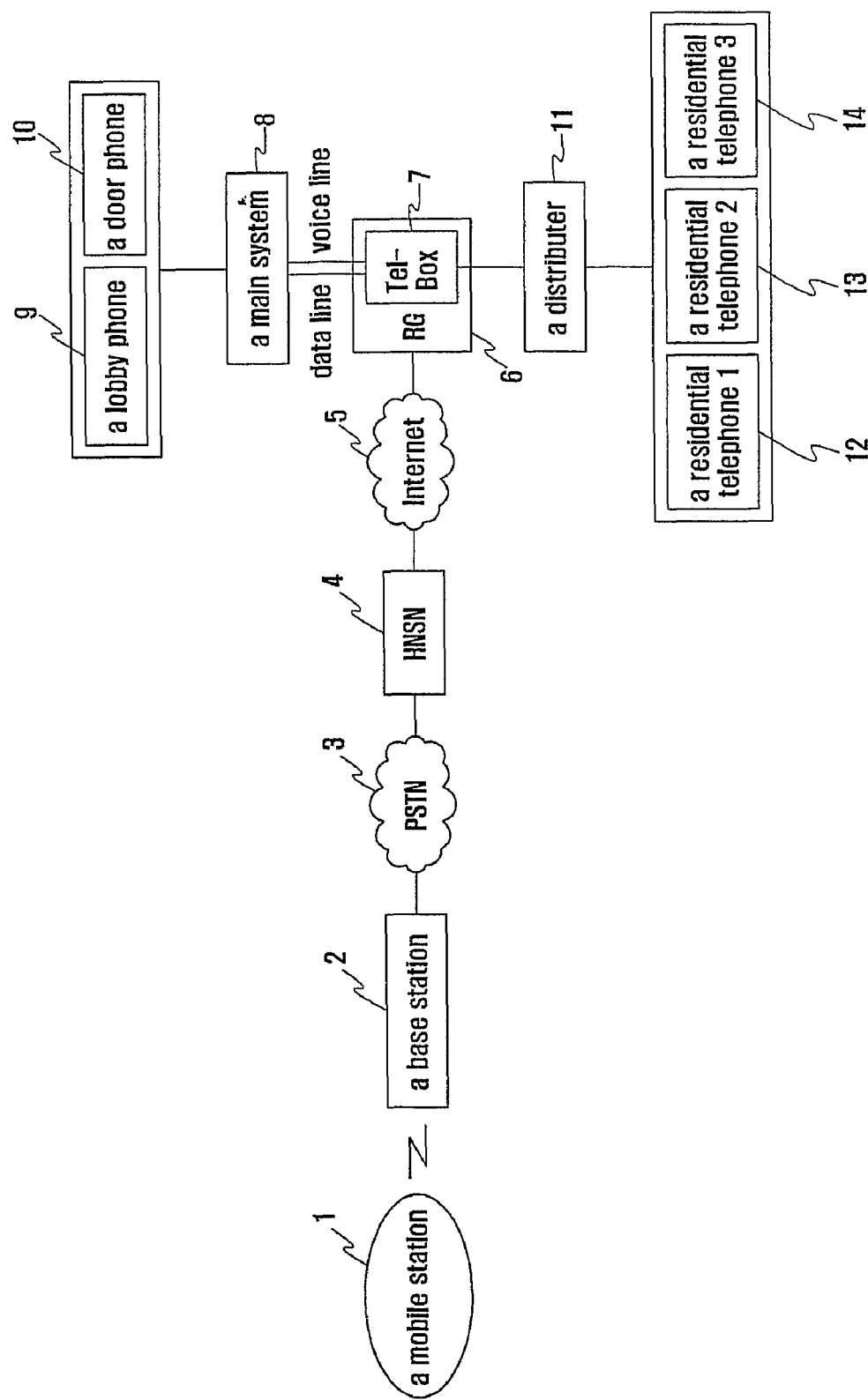
FIG. 1 is a structural drawing of the system for a visitor reception service in absence in accordance with an embodiment of the present invention.

FIG. 1 is a structural drawing of the system for a visitor reception service in absence in accordance with an embodiment of the present invention. As illustrated in FIG. 1, the system for a visitor reception service in absence of the present invention comprises a mobile station (1), a base station (2), a PSTN (Public Switched Telephone Network) (3), an HNSN (HomeNetwork Serving Node) (4), an Internet (5), an RG (Residential Gateway) (6), a Tel-Box (7) included in RG, a main system (8), a lobby phone (9) or a door phone (10), a distributer (11), a residential indoor telephone 1 (12), a residential indoor telephone 2(13), a residential indoor telephone 3(14).

The above mobile station (1) generates the control signal for the door control through HNSN (4), as well as performs a telephone call with a door phone (10). The mobile station (1) means a mobile phone (for cdma2000 1× Ev-Do or WCDMA, etc.) capable of exchanging ordinary data. Of course, a notebook or a PDA can also be used as a mobile station (1).

The above base station (2) accepts the call signal and the control signal transmitted from the above mobile station (1) and delivers them to network, or delivers the image data of a visitor received from network to the mobile station (1).

The above PSTN (3) performs the function for exchanging a call signal, a control signal, and image data between a corresponding base station (2) and an HNSN (4).

The above HNSN (4) interconnects networks including Internet (5) and the above PSTN (5), and performs the registration, the authentication, and the connection management of an RG (6). This HNSN (4) performs the registration, the authentication, and the connection management for residential indoor devices (i.e., located inside home). The HNSN (4) should have network information (IP and port number) of an RG (6) with a view to controlling the devices connected to an RG (6), and such information is managed in an HNSN (4) through the registration process of an RG (6). Moreover, the RG (6) continuously sends a message to an HNSN (4) after registration, and an HNSN (4) checks the current status of an RG (6). And since all the messages between an HNSN (4) and an RG (6) includes the data for authentication, the unauthenticated messages from an HNSN (4) or an RG (6) are denied.

The above RG (6) can make a plurality of devices connected, and an RG (6) is connected to Internet. The above devices can be the equipments composed of electrical/electronic appliances, a computer, a surveillance (monitoring) equipment, a telemeter, and a medical appliance for a remote user which are capable of controlling, monitoring, and interworking by data processing, and constructing all kinds of data networks. The present invention equips a Tel-Box (7) in the above RG (6).

The Tel-Box (7) provides the functions for monitoring the number of sounding times of ringing signal in the case that a call connection is requested from outside, for on/off hooks with residential indoor telephones (12, 13, 14), and for switching between the above PSTN (3) and a door phone (10) or residential indoor telephones (12, 13, 14).

For these functions, the main system (8) is connected to the above Tel-Box (7), a lobby phone (9) or a door phone (10) is connected to this main system (8). Moreover, a distributer (11) is connected to the above Tel-Box (7), and a plurality of residential indoor telephones (12, 13, 14) including a telephone 1 (12), a telephone 2 (13), and a telephone 3(14) are connected to the distributer (11).

Hereinafter, the method for a visitor reception service in absence using the system for a visitor reception service in absence in accordance with the present invention constructed as the above would be explained.

Figure 2:
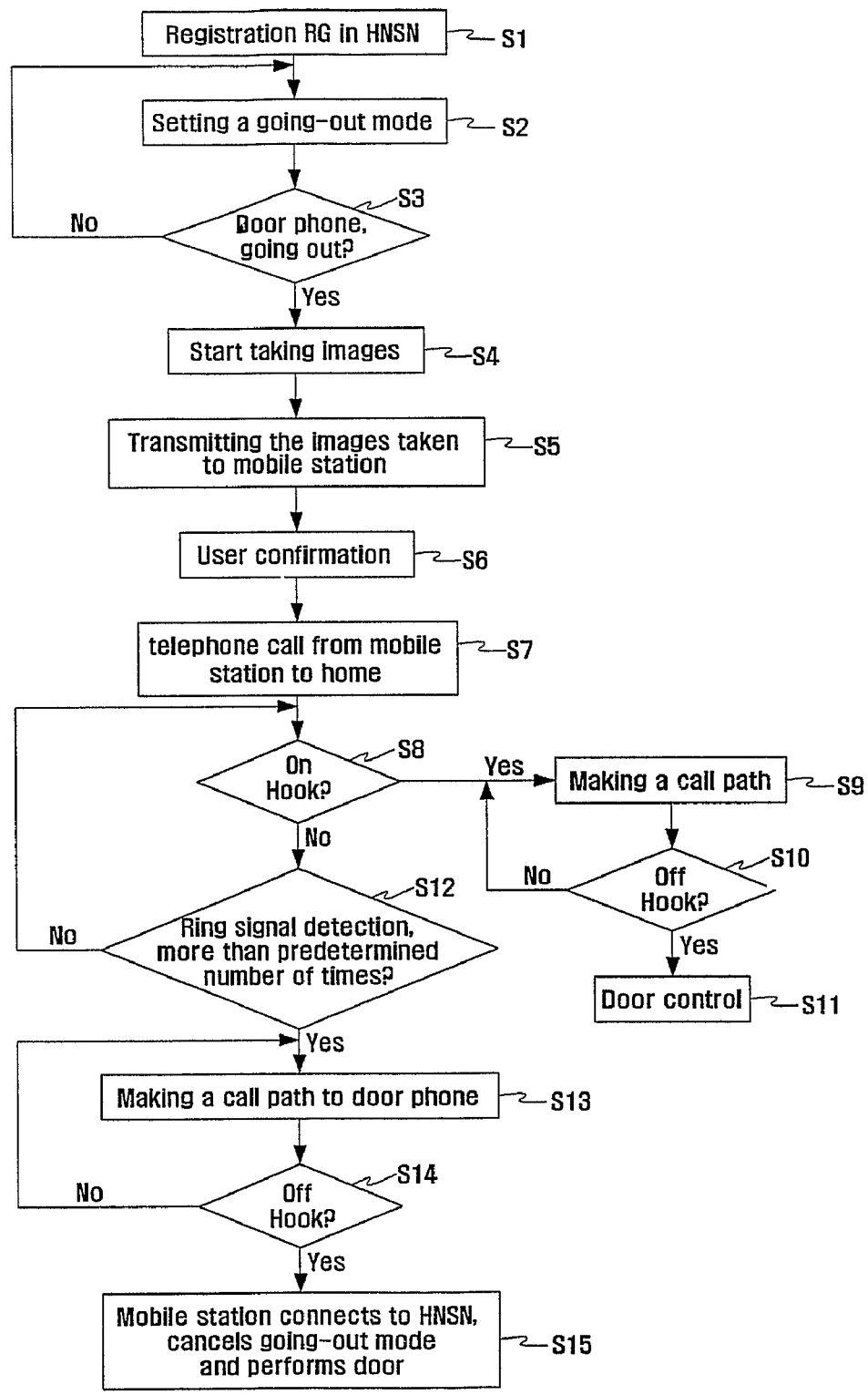
FIG. 2 is a flow diagram showing the method for a visitor reception service in absence in accordance with an embodiment of the present invention.

FIG. 2 is a flow diagram showing the method for a visitor reception service in absence in accordance with an embodiment of the present invention. In this embodiment, a door phone would be explained for the convenience of the explanation.

As referring to FIG. 2, an RG (6) requests the registration to an HNSN (4) with the information on ID, password, and IP, and an HNSN (6) responds to an RG (6) for the registration with its own network information (IP and port number). If the registration is successful, an RG (6) informs an HNSN (4) of its state by sending an authentication message at predetermined time (for example, once at a minute, with the information on ID, password, and IP).

At this time, in the case that a mobile station (1) user wants to go out, a going-out mode can be set using a door phone (10). Corresponding to the above going-out mode setting, the state of the door phone (10) is changed into the going-out state in an HNSN (4) through an RG (6) (S2).

Meanwhile, in the case that a visitor calls to the door phone (10) under the above situation (S3), imaging for the visitor using CCD camera equipped outside is resumed (S4). The image by said imaging is sent to a mobile station (1) (S5).

Accordingly, the mobile station (1) user checks the delivered image (S6), and tries to connect a call to his home (S7).

By trying to connect a call between the above mobile station (1) and the Tel-Box (7), the Tel-Box (7) discriminates whether the residential indoor telephones (12, 13, 14) are hooked on (S8). If an on-hook is discriminated by the above step, a call path between the above mobile station (1) and residential indoor telephones (12, 13, 14) becomes to be set up and a telephone call is accomplished (S9).

This situation can be happen under state that one of family members returns home after a mobile station (1) user goes out. The door can be directly controlled inside the home after terminating the call between the above mobile station (1) and residential indoor telephones (12, 13, 14) (S11). As such, a Tel-Box (7) performs the function to detect the hook on/off of residential indoor telephones (12, 13, 14), and the function to switch with the telephone called from outside.

Accordingly, in the case that residential indoor telephones (12, 13, 14) continuously preserve the state of hook-off as a result of hook-on discrimination in the above step S8, a Tel-Box (7) detects a ring signal in the next step, and discriminates whether the number of sounding times of the detected ring signal are over predetermined number of times of ring signal (S12). In the case that the number of sounding times of ring signal is detected more than predetermined number of times of ring signal, the above Tel-Box (7) makes a call path between a mobile station (1) and a door phone (10) through automatic switching (S13).

In the case that the fact that said visitor is a member of family or under the situation that should open the door is discriminated by the phone call with the above visitor, the door is controlled through HNSN (4).

That is, in the state that the call path is set up, the door can be opened by the control of a main system (8), by cancelling the setting of going-out mode through the connection with the above HNSN (4), and then by delivering the door open control signal to HNSN (4) using a mobile station (1).

Or, in the state of hook-off in the above step S13, a mobile station (1) can also perform the cancellation for a going-out mode setting and the door control through the connection with the above HNSN (4) (S14~S15).

Since those having ordinary knowledge and skill in the art of the present invention will recognize additional modifications and applications within the scope thereof, the present invention is not limited to the embodiments and drawings described above.

INDUSTRIAL APPLICABILITY

Recently, with a wide spread of Internet and advances in communication technologies, attention is paid to the area related to home network and home automation for the connection and use of various electrical/electronic devices and communication devices at home and office.

While the existing devices for home automation such as a videophone and an interphone only certifying a visitor's identity have been the main stream, a plurality of functions such as gas escape detection and fire alarm are getting added to those devices.

In the technologies related to the field of home network, standardization and technological development are being actively performed as classified by the communication technologies such as a wired LAN (i.e., a HomePNA and a IEEE1394), a wireless LAN (i.e., using HomeRF, etc.), a Bluetooth, and an IrDA communication. As it is called, the Lonworks based building automation system is being attracted attention in the area of home automation.

Thus, the system performing call path control with a visitor and the door control by the cooperation with an HNSN (HomeNetwork Serving Node) performing the function of a central server under the situations that home network and home automation, and an RG (Residential Gateway) located at home is applicable for industrial use.

The invention claimed is:

1. A system for a visitor response service in absence including
a central server (HNSN) controlling devices and delivering their control states by being connected to a mobile network,
and a gateway (RG) which interconnects with said HNSN through network and has connections with a plurality of devices,
characterized in that
said gateway includes
a Tel-Box for setting up a call path with said mobile network in absence said Tel-Box (7) comprising
a ring signal detection part detecting the number of sounding times of ring signal in the case that a call connection is requested from outside for switching the call path,
an on/off hook detection part for detecting on/off hook with residential indoor telephones (12, 13, 14),
and a switch performing the switching for setting-up a call path between said mobile network and devices, or a mobile network and residential indoor telephones (12, 13, 14),
a call path to a mobile network is set up using said switch in the case that the number of sounding times of ring signal in said ring signal detection part is more than predetermined number of times in the state that said on/off hook detection part detects on-hook.

2. A system for a visitor response service in absence as claimed in claim 1,
characterized in that said device is a door phone or a lobby phone, said door phone performs open/close controls for the door,
and a main system (8) transmitting an image data for a visitor is included.

3. A method for a visitor response service in absence using the system comprising a central server (HNSN) controlling devices and delivering their control states by being connected to a mobile network; and a gateway (RG) which includes a Tel-Box (7) including a ring signal detection part detecting the number of sounding times of ring signal in the case that a call connection is requested from outside for a call path switching, an on/off hook detection part detecting on/off hook with residential indoor telephones (12, 13, 14), and a switch performing the switching for setting up a call path between said mobile network and devices or between said mobile network and residential indoor telephones (12, 13, 14), interconnects with said HNSN through network,
and has a connection with a door phone,
characterized by comprising
a step 1 that said central server performs the registration and the authentication for the gateway which a door phone is connected to;
a step 2 imaging a visitor using the camera equipped outside the door in the case of being called from the door phone,
a step 3 transmitting said image data to a mobile station,
a step 4 that said mobile station user confirms said image data and tries a call connection to a residential indoor telephone using a mobile station,
and a step 5 setting up a call path between a mobile station and a door phone in the case that the number of sounding times of ring signal discriminated in said Tel-Box (7) is more than predetermined number of times.

4. A method for a visitor response service in absence as claimed in claim 3,
  characterized in that a step 6 that a mobile station connects to said central server and performs the door control can be proceeded after said step 5.

5. A method for a visitor response service in absence as claimed in claim 3,
  characterized in that a call path between said mobile station and a residential indoor telephone is set up by the switch of a Tel-Box (7) in case that a call connection between a mobile station and a residential indoor telephone is accomplished in said step 4.

6. A method for a visitor response service in absence as claimed in claim 3,
  characterized in that a going-out mode is set by using a door phone in said step 1.

* * * * *